3,745,125
COMPOSITION AND METHOD FOR DISPERSING OILY AND TARRY RESIDUES ON SURFACES
Giulio Marranci, Porto Torres, Gerardo Bianchi, Fertilia, and Alessandro Barbon, Rho, Milan, Italy, assignors to Societe Italiana Resine S.p.A., Milan, Italy
No Drawing. Filed May 11, 1971, Ser. No. 142,355
Claims priority, application Italy, May 12, 1970, 24,457/70
Int. Cl. B01f *17/42;* B01j *13/00*
U.S. Cl. 252—312                                4 Claims

ABSTRACT OF THE DISCLOSURE

A liquid oil-soluble and water-insoluble composition useful for dispersing oily and tarry residues on surfaces consisting essentially of from 20 to 25 percent by weight, based on the weight of the composition, of the liquid nonionic surface active condensation product of nonylphenol with polyethylene glycol, said polyethylene glycol having a molecular weight of from 4,000 to 6,000 and 80 to 75 percent by weight based on the weight of the composition, of liquid alkylbenzenes consisting essentially of the bottoms fraction obtained by the catalytic alkylation of benzene with propylene, said fraction boiling at a temperature of from 200 to 205° C. and containing at least 75 percent by weight of diisopropylbenzenes.

---

This invention relates to the dispersion and removal of oil or tarry residues particularly on the surface of the seawater, sea-shores, harbours equipments or tanks, and to a composition of matter therefor.

The sewers from the built-up areas, the industrial wastes and the washing water from the cargo boats or oil tankers may give rise to oil or tarry residues pollution.

Moreover areas of the sea, as well as harbours and beachs may become polluted owing to the oil tankers accidents either during the navigation or during their shipment or unloading.

Where this occurs, it may cause irreparable damage to the sea flora and fauna.

The oil on the sea water is subjected to vaporization and to the oxidative action of the air oxygen and of the oxygen dissolved in the water, as well as to microbiological oxidative processes.

Therefore the conversion occurs of the oil into lighter non toxic products, as well as into high boiling products, the latter being emulsified by means of the sea-water, or settled on the sea-bottom.

Though such reactions are slow, they allow a sufficient decomposition and a reasonable dispersion of the oil layer on the open sea, without seriously damaging the natural environment.

The greatest damages consequent to oil pollution occur near the shores, harbours and beaches, particularly on the areas in which the tide alternates.

Various methods have been suggested for removal of oil pollution on the surface of the sea-water.

According to these methods the oil is burned, or it is removed by means of pumps or other devices.

At the present time solvent compositions are widely used, said compositions being sprayed on the oil layer for dispersing the oil.

Since the solvent compositions known in the art are water soluble, large amounts of them are required for dispersing the oil.

Furthermore such compositions are toxic, so that their use is detrimental especially near to shores.

Finally the use of the solvent compositions known in the art is not advisable in view of their toxicity towards the sea micro-organisms which attack and dissolve the oil.

It has now been found that it is possible to overcome the drawbacks inherent in the present state of the art for dispersing the oil or tarry residues on the surface of the sea water as well as on the sea shores, harbours equipments or tanks.

It is an object of this invention to provide a composition of matter which is inexpensive and useful for dispersing the oil.

It is a further object of this invention to provide a composition of matter for dispersing the oil which is not detrimental to the sea flora and fauna, as well to micro-organisms which attack and dissolve the oil.

It is also a further object of this invention to provide a composition of matter for dispersing the oil which is oil soluble but water insoluble, so that small amounts of it are required for removal of oil pollution.

Other and related objects of this invention will be apparent from the following description.

The composition of matter of this invention is a liquid mitxure which comprises a non-ionic surface-active material and alkylbenzenes especially diisopropylbenzenes.

More particularly said liquid mixtures contain 70 to 85% by weight of alkylbenzenes and 20 to 25% by weight of a non-ionic surface-active material.

As alkylbenzenes the diisopropylbenzenes are used, alone or mixed with monoalkylbenzenes, the diisopropylbenzenes content being 60% by weight at least in the liquid mixtures.

The use of the liquid mixtures of this invention is advantageous first of all in that they comprise substances available at low price.

In fact as alkylbenzenes the cumene bottoms may be used, which are obtained from the cumene synthesis product, resulting by catalytically reacting benzene with propylene.

For this purpose the bottoms fraction may be used for boiling at temperatures ranging between 200 and 205° C., said fraction having a diisopropylbenzenes content higher than 75% by weight.

The non-ionic surface-active materials useful for the purpose of this invention, are the reaction products of an alkylphenol or an aliphatic alcohol with ethylene oxide, propylene oxide or a polyethylene glycol.

For the purpose the reaction products may be used of a monoalkylphenol or polyalkylphenol having 5 to 18 carbon atoms in the side chains, with 6 to 20, and preferably 8 to 12, moles of ethylene oxide.

Particularly useful are the following alkylphenols: diamylphenol, p-tert-octylphenol and nonylphenol.

As non-ionic surface-active materials the products may also be used which are obtained by reacting ethylene oxide or propylene oxide with an aliphatic alcohol having more than 8 carbon atoms in the chain.

Particularly useful for the purposes of this invention are the reaction products of the aliphatic alcohols having 18 carbon atoms in the chain, with more than 20 moles of ethylene oxide.

Finally as the non-ionic surface-active materials the products may also be used which are obtained by reacting the aliphatic acids with ethylene oxide or polyethylene glycols the latter having a molecular weight ranging between 4,000 and 6,000.

Typically the liquid mixtures of this invention contain the fraction of the cumene bottoms boiling at temperatures of 200–205° C. in an amount ranging between 75 and 80% by weight, and the reaction products of nonylphenol with polyethylene glycol in an amount ranging between 20 and 25% by weight.

The liquid mixtures of this invention are particularly useful for removal of the oil layer on the sea surface.

For this purpose a small amount of said mixtures is sprayed on the oil layer by means of nozzles to obtain the dispersion of the oil by emulsifying it with the sea-water.

The small drops of the oil into the emulsion are subsequently dispersed and turned away by the motion of the waves.

In order to hasten the dispersion of the oil it is useful to resort to mechanical agitation, as for example by means of the screw of outboard motors or water-spouts.

The small drops of the dispersed oil are easily attacked and decomposed by the sea microorganisms giving rise to harmless products such as water and carbon dioxide.

According to the present invention the best results are obtained by spraying the polluted areas by means of the liquid mixtures in an amount of about 10% by weight on the oil, when the sea is calm.

When the sea is rough the amount of the liquid mixture must be increased owing to the inevitable losses.

The liquid mixtures of this invention may also be previously emulsified with water, the emulsion being sprayed on the polluted area.

For this purpose an aqueous emulsion is prepared having a water content of about 90% by weight, by means of a suitable mixer.

The liquid mixtures of this invention are also effective for removing the oil or tarry residues from solid surfaces, such as beachs, harbour equipments, motors or tanks.

For this purpose the liquid mixtures are sprayed by means of nozzles and the polluted surfaces are then sprinkled with water-spouts.

EXAMPLE 1

A liquid mixture is prepared by mixing 20 parts by weight of the commercial non-ionic surface-active material FENOPAL produced by the Company ROL (a condensation product of nonylphenol with polyethylene glycol) and 80 parts by weight of the fraction of the cumene bottoms boiling at temperatures ranging between 200 and 205° C. said bottom fraction having the following composition:

| | Percent by weight |
|---|---|
| o-, m- and p-diisopropylbenzenes | 76 |
| Dialkylbenzenes | 3 |
| Monoalkylbenzenes | 18 |
| Unsaturated compounds | 1 |
| Unknown | 2 |

The liquid mixture had the following properties.

Colour: straw yellow
Density (15° C.): 0.915
Viscosity (20° C.): 4.0 cps.
Refractive index (20° C.): 1,485
Flash point (open cup): higher than 70° C.
Flash point (closed cup): higher than 68° C.
Reaction: neutral A cylindrical glass container having a diameter of 40 cm. and a height of 15 cm. was filled with sea-water to a height of 10 cm.

50 ml. of oil were added to the container so that a uniform layer was formed on the water surface.

One drop of the above defined liquid mixture was enough to immediately break down the oil layer and to cause coagulation of the oil on the walls of the container.

The water surface was completely cleaned.

EXAMPLE 2

50 kg. of mineral oil were poured on the sea surface to form a wide layer.

On said layer the liquid mixture of Example 1 was poured for 40" by means of the nozzles of a sprayer motor pump, having a delivery capacity of 10 l./min. at 4 atm.

Subsequently in order to speed up the emulsion of the oil with the sea water a mechanical agitation was used by means of the screw of an outboard motor and rapidly the sea-surface was entirely cleaned.

EXAMPLE 3

The liquid mixture of Example 1 was previously emulsified with sea-water, the content of said liquid mixture in the emulsion being 10% by weight.

An oil layer, obtained by pouring 50 kg. of mineral oil on the sea water, was sprayed with said emulsion for 45" by means of the nozzles of a sprayer motor pump having a delivery capacity of 100 l./min. at 8 atm.

In order to speed up the dispersion of the oil, a mechanical agitation was used by means of the screw of an outboard motor. Rapidly the sea-surface was entirely cleaned.

What we claim is:

1. A liquid oil-soluble and water-insoluble composition useful for dispersing oily and tarry residues on surfaces consisting essentially of from 20 to 25 percent by weight, based on the weight of the composition, of the liquid nonionic surface active condensation product of nonylphenol with polyethylene glycol, said polyethylene glycol having a molecular weight of from 4,000 to 6,000; and 80 to 75 percent by weight based on the weight of the composition, of liquid alkylbenzenes consisting essentially of the bottoms fraction obtained by the catalytic alkylation of benzene with propylene, said fraction boiling at a temperature of from 200 to 205° C. and containing at least 75 percent by weight of diisopropylbenzenes.

2. An aqueous emulsion consisting essentially of the composition of claim 1 emulsified in water, said emulsion containing about 10 percent by weight of said composition.

3. The composition of claim 1 wherein said alkylbenzenes contain about 76 percent by weight diisopropylbenzenes, about 3 percent by weight of other dialkyl benzenes and about 18 percent by weight of monoalkylbenzenes.

4. A method for dispersing oily or tarry residues on the surface of water comprising contacting said oily or tarry residue with a sufficient amount of the composition of claim 1 to form a dispersion with said oily or tarry residue.

References Cited

UNITED STATES PATENTS

| 3,577,340 | 5/1971 | Paviak et al. | 252—351 X |
| 2,447,475 | 8/1948 | Kaberg et al. | 252—312 X |
| 2,920,045 | 1/1960 | Hearn et al. | 252—529 |
| 2,269,529 | 1/1942 | Goldsmith | 252—356 X |

RICHARD D. LOVERING, Primary Examiner

U.S. Cl. X.R.

210—DIG 21; 252—170, 351, 356, DIG 1